July 11, 1933.　　　　F. HENRIOT　　　　1,917,972
HYDRAULIC CLUTCH OR BRAKING DEVICE
Filed May 16, 1931
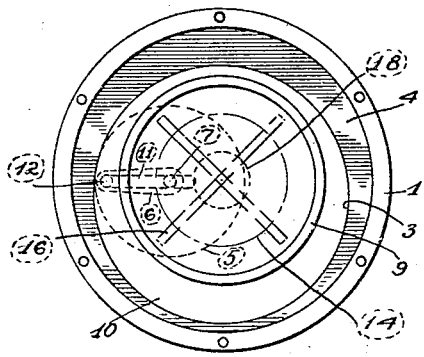
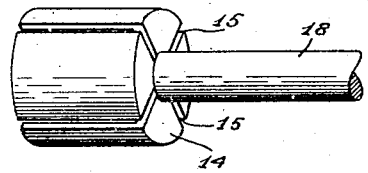
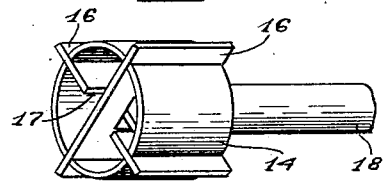
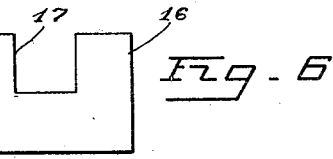
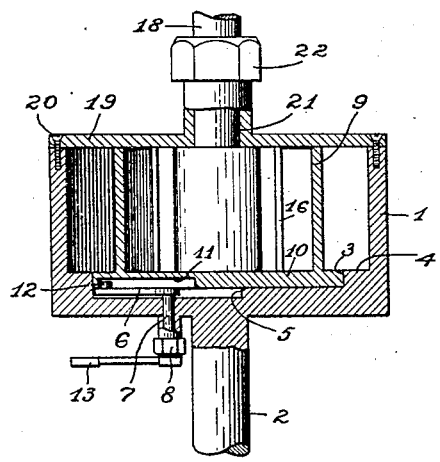
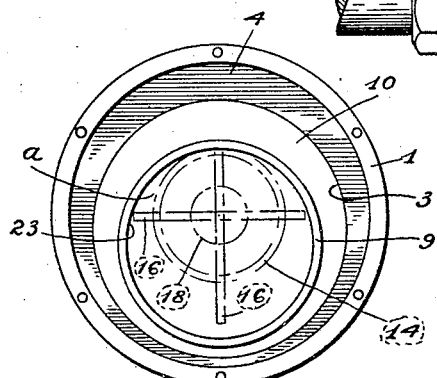
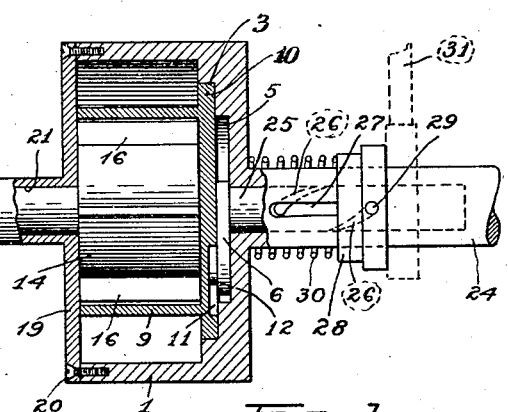
INVENTOR.
FLOYD HENRIOT.
BY
Munn & Co.
ATTORNEYS.

UNITED STATES PATENT OFFICE

FLOYD HENRIOT, OF KLAMATH FALLS, OREGON

HYDRAULIC CLUTCH OR BRAKING DEVICE

Application filed May 16, 1931. Serial No. 537,948.

My invention relates to improvements in hydraulic clutch or braking devices and it consists of the combinations, constructions and arrangements hereinafter described and claimed.

An object of my invention is to provide an hydraulic clutch or braking device making use of two members rotatable with respect to each other, one of the members having vanes. The members are interconnected by a fluid and can be moved into eccentric positions for causing the rotation of one of the members to tend to rotate the other member. If the second member is held against rotation it will be seen that it will have a braking action on the first member when the adjustment is such that the first one will try to rotate the second one.

The device can also be used for other purposes, such as a clutch and a variable speed transmission or a combination of transmission and clutch. The device is extremely simple in construction, and when used as a transmission, can effect a gradual change in speed between the drive and the driven member which is impossible with the standard mechanical type of transmission. For example, if the driving member is rotating at 2000 R. P. M., the device may be adjusted so that the driven member is gradually accelerated in speed from a standstill to a speed equal to the driving member.

Other objects and advantages will appear in the following specification, and the novel features of the device will be particularly pointed out in the appended claims.

My invention is illustrated in the accompanying drawing forming a part of this application, in which Figure 1 is a sectional view through the device, portions being shown in elevation;

Figure 2 is an end view of a modified form with parts of the device removed;

Figure 3 is a transverse section through Figure 2, parts being shown in elevation;

Figure 4 is a perspective view of the rotor;

Figure 5 is another perspective view of the rotor showing the vanes in place;

Figure 6 is a plan view of one of the vanes; and

Figure 7 is a view similar to Figure 2 but showing the parts in a different position.

In carrying out my invention I provide an outer shell 1 (see Figure 3) that is mounted upon a shaft 2. The shell or drum is preferably cylindrical and is concentrically mounted with respect to the shaft 2. An eccentric recess 3 is formed in the end wall 4 of the shell 1 and the recess 3 has a depression 5 for receiving a shifting finger 6. The finger is mounted upon a shaft 7 which extends through the end wall 4 and a packing gland 8.

An inner shell or cylinder 9 is eccentrically mounted on a disc 10 that is received in the recess 3. The outer surface of the disc 10 has a radially extending slot 11 for receiving a projection 12 carried by the shifting finger 6. A shifting lever 13 is secured to the shaft 7 and a rocking of this lever will swing the disc 10 in the recess 3 for moving the inner shell 9 from a concentric relation with respect to the outer shell 1 as shown in Figure 2 into an eccentric relation as shown in Figure 7.

Within the inner shell 9, I mount a rotor 14 of the shape shown in Figures 4 and 5. The outer diameter of the rotor is less than the inner diameter of the inner shell (see Figures 2 and 7). The rotor is cylindrical in shape and has diametrically disposed slots 15 for slidably receiving vanes 16. In Figure 5, I show two vanes 16 and each is provided with a recess 17 to permit relative movement between the vanes.

The rotor 14 is supported by a shaft 18 that is axially aligned with the shaft 2 when the device is assembled. In Figure 3, I show a fluid tight cover 19, that is secured to the outer shell by screws 20, or other suitable fastening means. The oil tight cover has a tubular portion 21 for receiving the shaft 18 and a packing gland 22 is mounted at the outer end of the tubular member.

From the foregoing description of the various parts of the device, the operation thereof may be readily understood.

The device shown in Figures 2 to 7 inclusive can be used as a clutch or a braking device. When the inner shell 9 is concentric with respect to the rotor 14 there will be no binding action between the shafts 2 and 18. The fluid that fills the inner shell 9 will be circulated within the shell by the vanes 16 during the rotation of the shaft 18. When the device is used for a brake the shell 1 is held against rotation.

If now the handle 13 is swung, the inner shell 9 will be moved into an eccentric position with respect to the rotor 14 as shown in Figure 7. If now the shaft 18 is rotated in a clockwise direction, a pocket $a$ will be formed by the inner surface 23 of the inner shell 9, a portion of the outer surface of the rotor 14, and a portion of the vane 16. The vane 16 forming a portion of the pocket will be moved in the direction of its length by the camming action caused by the inner surface 23. This will reduce the size of the pocket $a$ and the pocket will further be reduced by the swinging of the vane 16 in a clockwise direction. The liquid trapped in the pocket will tend to escape between the vane 16 and the inner surface 23 and between the outer surface of the rotor 14 and the surface 23. The escape of the liquid, however, is not fast enough to free all of the liquid, and therefore the trapped liquid will act as a wedge in connecting the inner shell 9 with the rotor 14. The result is a braking action upon the shaft 18 because the inner shell 9 and the outer shell 1 are held against rotation. If the inner shell 9 is slowly moved from a concentric position into the eccentric position shown in Figure 7 the braking action will be gradually applied and the shaft 18 will be slowly brought to a stop. The same braking action is effective on the shaft 18 regardless of the direction of rotation.

In Figure 1, I show the device applied to a transmission for causing the driven shaft to rotate at any desired speed up to a speed equal to the driving shaft. This form of the device can also act as a clutch. In this form of the device the shell 1 is mounted upon a hollow shaft 24 corresponding to the shaft 2. The shifting finger 6 is mounted upon a stub shaft 25 that takes the place of the shaft 7. The stub shaft 25 is concentrically mounted within the shaft 24 and has two spiral grooves 26. The shaft 24 has two longitudinally extending grooves 27. A collar 28 slides on the shaft 24 and has pins 29 that enter the slots 27 and the grooves 26. A spring 30 urges the collar 28 to the right in Figure 1.

In the operation of this form of the device the wedging action of the trapped fluid will take place in the same manner as that described in the device when used as a brake. The change in structure in the transmission form of the device is solely for the purpose of adjusting the inner shell 9 with respect to the outer shell 1 during the actual rotation of the shafts 24 and 18. A fork 31 or other suitable means is used for moving the collar 28 to the left in Figure 1. The movement of the collar 28 can be accomplished while the shaft 24 is rotating. This movement will cause the pins 29 to slide in the slots 27 and grooves 26 and cause a rotation between the shaft 24 and 25 and this rotation will rock the shifting finger and change the position of the inner shell 9 with respect to the outer shell 1.

If the shaft 24 is the driving one, and the inner shell 9 is concentric with the outer shell 1 there will be no rotation of the shaft 18. A gradual moving of the inner shell 9 into an eccentric position by the means already described will cause the shaft 18 to gradually pick up in speed until it is rotating at the same speed as the shaft 24. Any ratio of speeds can be had by this mechanism. It is obvious that the shaft 18 can be the driving shaft if desired, and the shaft 24 the driven one.

Although I have shown and described two embodiments of my invention it is to be understood that the same is susceptible of various changes and I reserve the right to employ such changes as may come within the scope of the claims hereto annexed.

The space between the outer and inner shells 1 and 9 is filled with a fluid such as oil and this reserve supply of oil also facilitates the cooling of the device. The outer shell or drum 1 supports the inner shell or cylinder 9. All driving between the parts is done on a cushion of oil so that smooth operation is assured at all times.

There are few moving parts and when in free running position, the rotor is the only moving part. When the device is used as a brake there is very little wear. The device is inexpensive to manufacture because it is made up of parts that can be either stamped or cast. The device has a long life because the parts continually run in oil. Braking is not accomplished by friction, but by internal oil pressure.

I claim:

1. A rotatable shaft carrying a concentric drum with an axially aligned sleeve, the end of the drum disposed adjacent to the shaft having a circular recess eccentrically disposed, a disc rockable in the recess and having an eccentric cylinder extending from end to end of the drum, means for rocking the disc in the recess for moving the cylinder from a concentric to an eccentric position with respect to the drum, a rotatable shaft mounted in the sleeve and carrying a concentric rotor that is smaller in diameter than the cylinder and is rotatably mounted therein, diametrically extending vanes carried by the rotor and projecting beyond its periphery, and a fluid filling the cylinder.

2. A rotatable shaft carrying a concentric drum with an axially aligned sleeve, the end of the drum disposed adjacent to the shaft having a circular recess eccentrically disposed, a disc rockable in the recess and having an eccentric cylinder extending from end to end of the drum, means for rocking the disc in the recess for moving the cylinder from a concentric to an eccentric position with respect to the drum, a rotatable shaft mounted in the sleeve and carrying a concentric rotor that is smaller in diameter than the cylinder and is rotatably mounted therein, diametrically extending vanes carried by the rotor and projecting beyond its periphery, and a fluid filling the cylinder, said means comprising a shifting finger having an end connected to the disc, a stub shaft connected to the other end of the finger, and means for rocking the stub shaft.

3. A transmission comprising a rotatable shaft having a central bore therein, a drum mounted concentrically on the end of the shaft and having a concentrically disposed sleeve projecting from its other end, a cylinder mounted in said drum, means for moving the cylinder eccentrically with respect to the drum, said means including a stub shaft mounted in the bore and having spiral grooves, said first named shaft having longitudinally extending slots, a collar slidable on the first shaft and having pins slidable in the slots and grooves, a rotatable shaft mounted in the sleeve and carrying a rotor disposed in the cylinder, vanes projecting from the rotor and being moved longitudinally by the cylinder when the cylinder is eccentric to the rotor, and a fluid filling the cylinder.

4. In combination, a drum having an eccentric recess, a disc mounted in the recess and carrying a cylinder, a rotor mounted in the cylinder and having its axis aligned with the axis of the drum vanes carried by the rotor and being substantially equal to the inner diameter of the cylinder, and means for rocking the disc with respect to the drum for moving the cylinder eccentrically to the rotor.

FLOYD HENRIOT.